United States Patent
Yoon et al.

(10) Patent No.: US 9,271,243 B2
(45) Date of Patent: Feb. 23, 2016

(54) WIRELESS ACCESS POINT AND METHOD AND DEVICE FOR CONTROLLING WIRELESS ACCESS POINT

(75) Inventors: Byung Wan Yoon, Gunpo-si (KR); Jae Ho Chung, Seoul (KR); Joo Young Yoon, Yongin-si (KR); Kyu Jeong Han, Suwon-si (KR); Yung Ha Ji, Seongnam-si (KR)

(73) Assignee: KT Corporation, Seongnam-si (KR)

( * ) Notice: Subject to any disclaimer, the term of this patent is extended or adjusted under 35 U.S.C. 154(b) by 120 days.

(21) Appl. No.: 14/123,672

(22) PCT Filed: Oct. 19, 2011

(86) PCT No.: PCT/KR2011/007792
§ 371 (c)(1),
(2), (4) Date: May 15, 2014

(87) PCT Pub. No.: WO2012/165724
PCT Pub. Date: Dec. 6, 2012

(65) Prior Publication Data
US 2014/0321300 A1    Oct. 30, 2014

(30) Foreign Application Priority Data

Jun. 3, 2011  (KR) ........................ 10-2011-0054124

(51) Int. Cl.
*H04W 24/02* (2009.01)
*H04W 52/24* (2009.01)
*H04B 17/318* (2015.01)
*H04L 1/18* (2006.01)
*H04W 28/04* (2009.01)
*H04W 84/04* (2009.01)

(52) U.S. Cl.
CPC ........... *H04W 52/245* (2013.01); *H04B 17/318* (2015.01); *H04L 1/18* (2013.01); *H04W 24/02* (2013.01); *H04W 28/048* (2013.01); *H04W 84/045* (2013.01)

(58) Field of Classification Search
None
See application file for complete search history.

(56) References Cited

U.S. PATENT DOCUMENTS

| 7,715,353 | B2* | 5/2010 | Jain et al. ..................... 370/338 |
| 2004/0037258 | A1* | 2/2004 | Scherzer et al. .............. 370/338 |
| 2006/0187873 | A1* | 8/2006 | Friday et al. ................. 370/328 |
| 2007/0049319 | A1* | 3/2007 | Hart et al. ..................... 455/522 |
| 2008/0130541 | A1* | 6/2008 | Kokku et al. ................. 370/311 |
| 2009/0010229 | A1* | 1/2009 | Kazmi et al. ................. 370/336 |
| 2009/0081970 | A1* | 3/2009 | Yavuz et al. ............... 455/114.2 |
| 2011/0122788 | A1* | 5/2011 | Sombrutzki et al. .......... 370/252 |
| 2012/0224483 | A1* | 9/2012 | Babiarz et al. ................ 370/232 |

* cited by examiner

*Primary Examiner* — Duc Duong
(74) *Attorney, Agent, or Firm* — Sughrue Mion, PLLC

(57) ABSTRACT

The device for controlling a wireless access point comprises: a grouping unit which groups wireless access points which use the same channel, by using channel use information received from the wireless access points; a map generator which computes each received signal strength value of the grouped wireless access points and each output strength value of the grouped wireless access points; an extractor which extracts a wireless access point having the highest received signal strength value among the grouped wireless access points, if interference occurs between said grouped wireless access points; and an optimal output strength value-calculator which computes a corrected output strength value by using the received signal strength value of the extracted wireless access point, a threshold value of predetermined received signal strength, and a currently used output strength value between said grouped wireless access points.

11 Claims, 6 Drawing Sheets

Virtual map generated as multi-group (multi-layer)

WIRELESS ACCESS POINT AND METHOD AND DEVICE FOR CONTROLLING WIRELESS ACCESS POINT

CROSS-REFERENCES TO RELATED APPLICATIONS

The present application is a National Stage of International Application No. PCT/KR2011/007792, filed on Oct. 19, 2011, which claims priority from Korean Patent Application No. 10-2011-0054124, filed on Jun. 3, 2011, the contents of which are all incorporated herein by reference in their entirety.

BACKGROUND

1. Field

Apparatuses and methods consistent with exemplary embodiments relate to a wireless access point and a method and a device for controlling the wireless access point, and more specifically to a method and a device for controlling a wireless access point to optimize its coverage and capacity under in an environment of interference.

2. Description of Related Art

When services are provided using a wireless LAN, a house or a specific area is serviced using a single access point ("AP" hereinafter).

However, due to the structure of a building or the geographical features, the house or specific area may not be completely covered by the service using a single AP.

One way of solving this problem is by installing a separate AP (low-output AP) in shadow areas to widen the user's range of wireless communication.

However, when two APs happen to use the same channel, interference can occur in a certain area.

That is, when a separate AP is used to eliminate the shadow areas, the separate AP is designed to transmit a fixed transmission power, and the separate AP transmits an excessive transmission power in order to eliminate the shadow areas, causing interference and deteriorating the performance of the wireless network.

For this reason, Korean Patent Publication 2006-0034461 (Sub Access Point, system and method for controlling power of transmitting signal) discloses that the power level of a transmission signal output from a sub-AP is adjusted based on received signal strength indicator (RSSI) readings and frame error rate (FER) of a main AP, thereby eliminating shadow areas and minimizing interference between the main AP and the sub-AP. However, this Korean Patent Publication is restricted with the condition that the sub-AP itself needs to adjust the transmission power.

That is, since each of a plurality of sub-APs using the same channel needs to adjust the transmission power individually, it is impossible and inefficient to minimize the interference within a short period of time.

SUMMARY

To solve the above-described problem of the conventional art, exemplary embodiments provide a method and a device for minimizing interference between neighboring access points without a cell planning step.

The objects of the present invention are not limited to the above description, and any other objects not described herein will be clearly understood from the disclosure below.

According to an aspect of an exemplary embodiment, a device for controlling a wireless access point is provided. The device includes: a grouping unit configured to group wireless access points using a same channel based on channel use information received from the wireless access points; a map generator configured to compute a received signal strength indicator (RSSI) between the grouped wireless access points and an output strength value for each of the grouped wireless access points; an extractor configured to extract a wireless access point having the highest RSSI value among the grouped wireless access points, if interference occurs between the grouped wireless access points; and an optimal output strength value-calculator configured to compute a corrected output strength value based on the highest RSSI value of the extracted wireless access point, a predetermined threshold value of the RSSI between the grouped wireless access points, and a currently used output strength value.

According to an aspect of an exemplary embodiment, the device for controlling a wireless access point can also include an output adjustment requester configured to transmit an output strength adjustment request, which is related to adjusting a current output strength value based on the corrected output strength value, to each of the grouped wireless access points.

The device for controlling a wireless access point can also include an interference occurrence notification receiver configured to receive a message indicating whether interference has occurred between the grouped wireless access points. Occurrence of the interference can be determined by the grouped wireless access points based on an RSSI value and a number of ACK communication failures between the grouped wireless access points and a wireless terminal that accesses the grouped wireless access points.

The map generator can generate a virtual map including RSSI values between the grouped wireless access points and the output strength value of each of the grouped wireless access points.

The optimal output strength value calculator can compute the corrected output strength value by subtracting a difference between the RSSI value of the extracted wireless access point and the predetermined threshold value of an RSSI value between the grouped wireless access points from the currently used output strength value.

According to an aspect of an exemplary embodiment, a wireless access point having an output strength value thereof controlled by a device for controlling the wireless access point is provided. The wireless access point in accordance with an exemplary embodiment can include: a channel setter configured to set a channel for communication; an information transmitter configured to search for neighboring wireless access points through the set channel and transmit information on the searched neighboring wireless access points and the wireless access point; a calculator configured to compute a number of ACK communication failures with a wireless terminal and a received signal strength indicator (RSSI) value, once the wireless terminal is connected; and an interference occurrence notifier configured to transmit a message indicating that interference has occurred, to the device for controlling the wireless access point if it is determined that the interference with the neighboring wireless access point has occurred, based on the computed number of ACK communication failure with the wireless terminal and the RSSI value.

The wireless access point can also include an output strength adjuster configured to receive a corrected output strength value from the device for controlling the wireless access point and adjust a current output strength value based on the corrected output strength value.

The calculator can check whether the wireless terminal is connected and, if there is no wireless terminal connected, request the information transmitter to search for the neighboring wireless access points.

The interference occurrence notifier can determine that the occurrence has occurred if a current RSSI value is greater than a previous RSSI value and the number of ACK communication failure with a current wireless terminal is greater than the number of ACK communication failure with a previous wireless terminal.

The interference occurrence notifier can apply a predetermined margin value to the previous RSSI value and the number of ACK communication failure with the current wireless terminal, and fluctuation of the RSSI value caused by a movement of the wireless terminal is considered for the predetermined margin value.

According to an aspect of an exemplary embodiment, a method for controlling an output strength value of the wireless access point by a device for controlling a wireless access point is provided. The method for controlling an output strength value of a wireless access point can include: (a) setting a channel for communication, searching for neighboring wireless access points, and transmitting information on the wireless access point and the searched neighboring wireless access points to the device for controlling the wireless access point, wherein the setting, searching and transmitting being performed by the wireless access point; (b) grouping wireless access points using a same channel, based on the information on the wireless access point and the neighboring wireless access points received from the wireless access point, the grouping being performed by the device for controlling the wireless access point; (c) determining whether interference has occurred between the grouped wireless access points and transmitting the determination to the device for controlling a wireless access point, the determining and the transmitting the determination being performed by the grouped wireless access points; (d) computing a corrected output strength value for reducing the interference and transmitting the corrected output strength value to the grouped wireless access points, the computing and the transmitting the corrected output strength being performed by the device for controlling the wireless access point; and (e) adjusting a current output strength value based on the corrected output strength value, the adjusting being performed by the grouped wireless access points.

According to another aspect of an exemplary embodiment, the information transmitter may search for the neighboring wireless access points within a predetermined range.

According to another aspect of an exemplary embodiment, the calculator may compute the number of ACK communication failures with a wireless terminal and the received signal strength indicator (RSSI) at every predetermined interval.

According to another aspect of an exemplary embodiment, the output adjustment requester may transmit the output strength adjustment request to each of the grouped wireless access points via the same channel.

Specific details for achieving the above objects will become more apparent by referring to the accompanying drawings as well as the embodiments described below.

However, the present invention shall not be restricted to the embodiments disclosed below and can be configured in various other forms, and the embodiments described herein are provided only to complete the disclosure of the present invention and to allow a person of ordinary skill in the art to which the present invention pertains to fully understand the scope of the present invention.

According to the method and device for controlling a wireless access point described above, the interference between the access points can be minimized without introducing cell planning procedures.

Moreover, minimizing the interference between neighboring access points can take a shorter time, and an optimal wireless communication environment can be provided.

DETAILED DESCRIPTION

Hereinafter, exemplary embodiments will be described in detail with reference to the accompanying drawings in such a way that a person of ordinary skill in the art to which the present invention pertains can readily implement the present invention.

Nevertheless, the exemplary embodiments can be realized in various forms and shall not be restricted to the exemplary embodiments described herein.

Moreover, in order to describe the exemplary embodiments more clearly, any portions of the drawings that are not related to the description are omitted, and throughout the specification, similar reference numerals are designated to similar elements.

When a certain element is described to be "connected" to another element, it includes not only the case of "directly being connected" but also "electrically being connected" with another device therebetween.

Moreover, when a portion is described to "include" a certain element, it does not mean that another element is excluded but means that another element can be further included, unless otherwise described.

Hereinafter, an exemplary embodiment will be described in detail with reference to the accompanying drawings that illustrate the configurations and process flows.

Figure 1:
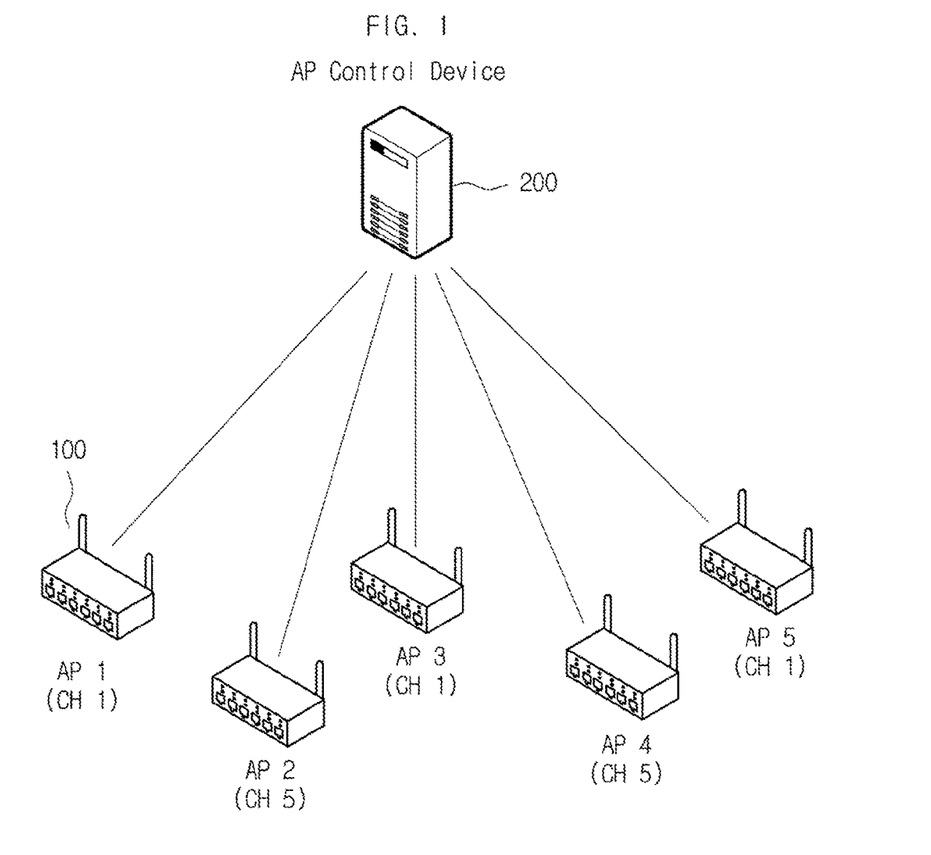
FIG. 1 illustrates the configuration of a system for controlling a wireless access point in accordance with an exemplary embodiment.

FIG. 1 illustrates the configuration of a system for controlling a wireless access point in accordance with an exemplary embodiment.

The system for controlling a wireless access point in accordance with an exemplary embodiment includes a plurality of wireless access points 100 and a device 200 for controlling a wireless access point.

The wireless access point ("AP" hereinafter) 100 outputs a transmission signal for wireless communication to a wireless network terminal that is present in a wireless network environment, and transmits a Beacon frame and a data frame to wireless network devices.

Moreover, the AP 100 can provide a certain service to the wireless network devices through the transmission signal and allow the wireless network devices to communicate with one another.

FIG. 1 shows that there are a plurality of APs 100. Each AP 100 uses a channel for wireless communication, and if interference occurs between APs 100 using the same channel, the device 200 for controlling a wireless access point can simultaneously control the output strength values of the APs 100 using the same channel.

For this, the AP 100 configures the channel for communication and searches for neighboring APs that are present in a predetermined range.

Afterwards, the AP 100 transmits information on the searched neighboring APs and information on itself 100, i.e., the channel used, a Received Signal Strength Indicator ("RSSI" hereinafter) value and the output strength value to the device 200 for controlling a wireless access point.

Moreover, the AP 100 determines whether interference occurs with neighboring APs that use the same channel at predetermined intervals, and if it is determined that interference has occurred between the APs, the AP 100 transmits a notification message to the device 200 for controlling a wireless access point.

Then, the AP 100 receives a corrected output strength value from the device 200 for controlling a wireless access point, and adjusts the current output strength value based on the received output strength value.

Here, each of the APs using the same channel simultaneously receives the corrected output strength value from the device 200 for controlling a wireless access point and adjusts the current output strength value, making it possible to minimize the interference between the APs in the shortest amount of time.

Meanwhile, the device 200 for controlling a wireless access point ("AP control device" hereinafter) receives from the AP 100 information on neighboring APs and itself, groups the APs using the same channel, and generates a virtual map based on the RSSI value between the grouped APs and the output strength value of each AP.

Then, if the AP control device 200 receives from the AP 100 a message notifying that interference has occurred between APs using the same channel, the AP control device 200 computes an optimal output strength value for each AP, with which the interference can be minimized, based on the generated virtual map and transmits the computed optimal output strength value to each AP using the channel.

Afterwards, the plurality of APs (using the same channel) having received the corrected output strength value from the AP control device 200 can adjust the current output strength value simultaneously based on the received output strength value.

Figure 2:
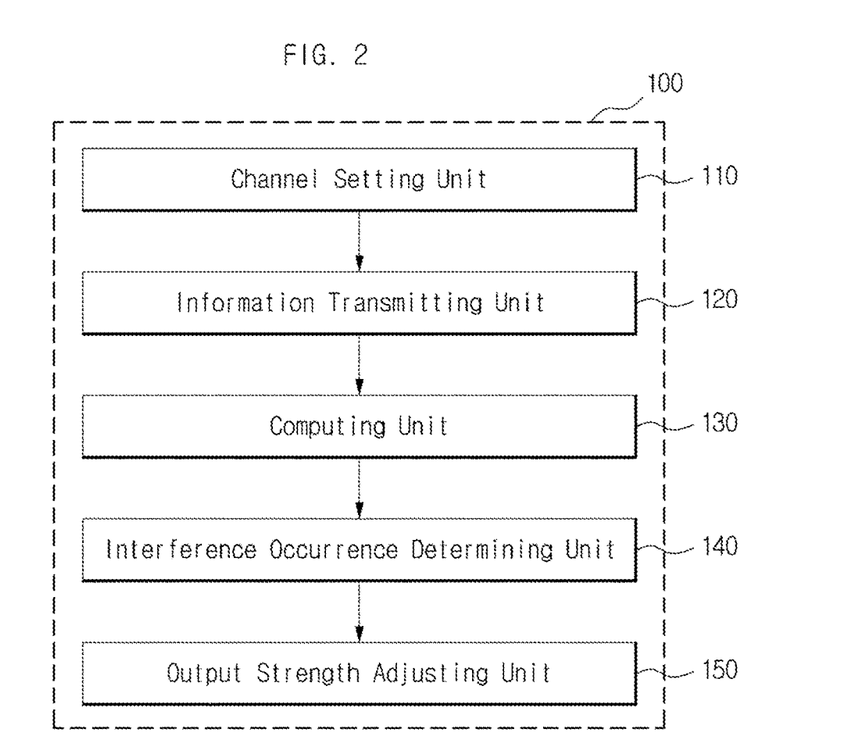
FIG. 2 is a block diagram showing the configuration of a wireless access point in accordance with an exemplary embodiment.

FIG. 2 is a block diagram showing the configuration of the AP 100 in accordance with an exemplary embodiment.

The AP 100 in accordance with an exemplary embodiment includes a channel setting unit 110 ("channel setter"), an information transmitting unit 120 ("information transmitter"), a computing unit 130 ("calculator"), an interference occurrence determining unit 140 ("interference occurrence determiner") and an output strength adjusting unit 150 ("output strength adjuster").

The channel setting unit 110 sets a channel for communication, and the information transmitting unit 120 searches for neighboring APs that are present within a predetermined range through the set channel and transmits information on the searched neighboring APs and the AP 100 itself.

Here, the information on the searched neighboring APs and AP 100 can include at least one of a currently used channel, an RSSI value and an output strength value.

Once the wireless network terminal ("wireless terminal" hereinafter) accesses the AP 100, the computing unit 130 computes the number of ACK communication failures and the RSSI value at every predetermined interval.

Here, due to the characteristics of WiFi, the wireless terminal can transmit an ACK (signal) to the AP 100 after the transmission of data frames is completed, and the computing unit 130 can monitor the status of the channel by counting ACKs.

Moreover, the computing unit 130 can check whether the wireless terminal is connected at predetermined intervals, and if there is no connection of the wireless terminal, the computing unit 130 can request the information transmitting unit 120 to search for neighboring APs.

The interference occurrence determining unit 140 determines whether interference with a neighboring AP has occurred, based on the number of ACK communication failures and the RSSI value with respect to the wireless terminal. The ACK communication failures and the RSSI value are computed by the computing unit 130.

Specifically, the interference occurrence determining unit 140 can determine that interference has occurred between APs if a current RSSI value (RSSI_current) is greater than a previous RSSI value (RSSI_past) and the number of ACK communication failures with a current wireless terminal (data_fail_cnt_current) is greater than the number of ACK communication failures with a previous wireless terminal (data_fail_cnt_past), based on the predetermined interval.

Here, the interference occurrence determining unit 140 can apply a predetermined margin value to RSSI_past and data_fail_cnt_current, wherein fluctuation of the RSSI value caused by a movement of the wireless terminal is considered for the predetermined margin value.

For instance, RSSI_margin, which is a margin value indicating an allowed range of fluctuation of RSSI, can be subtracted from RSSI-past, and cnt_margin, which is a margin value indicating an allowed range of fluctuation of the data fail count, can be multiplied by data_fail_cnt_current.

As a result, if the interference occurrence determining unit 140 determines that interference has occurred between the APs that are grouped with the same channel, it can be briefly indicated as follows.

$$\text{RSSI\_past} - \text{RSSI\_margin} < \text{RSSI\_current}$$

and $$\text{data\_fail\_cnt\_past} < \text{data\_fail\_cnt\_current} * \text{cnt\_margin}$$

Later, if the interference occurrence determining unit 140 determines that interference has occurred between APs, the interference occurrence determining unit 140 transmits a message indicating that interference has occurred, to the AP control device 200.

The output strength adjusting unit 150 receives the corrected output strength value for minimizing the interference from the AP control device 200 and adjusts the current output strength value based on the corrected output strength value.

Here, adjusting the current output strength value based on the corrected output strength value based on the corrected output strength value received from the AP control device 200 can be simultaneously performed for every AP that uses the same channel.

Figure 3:
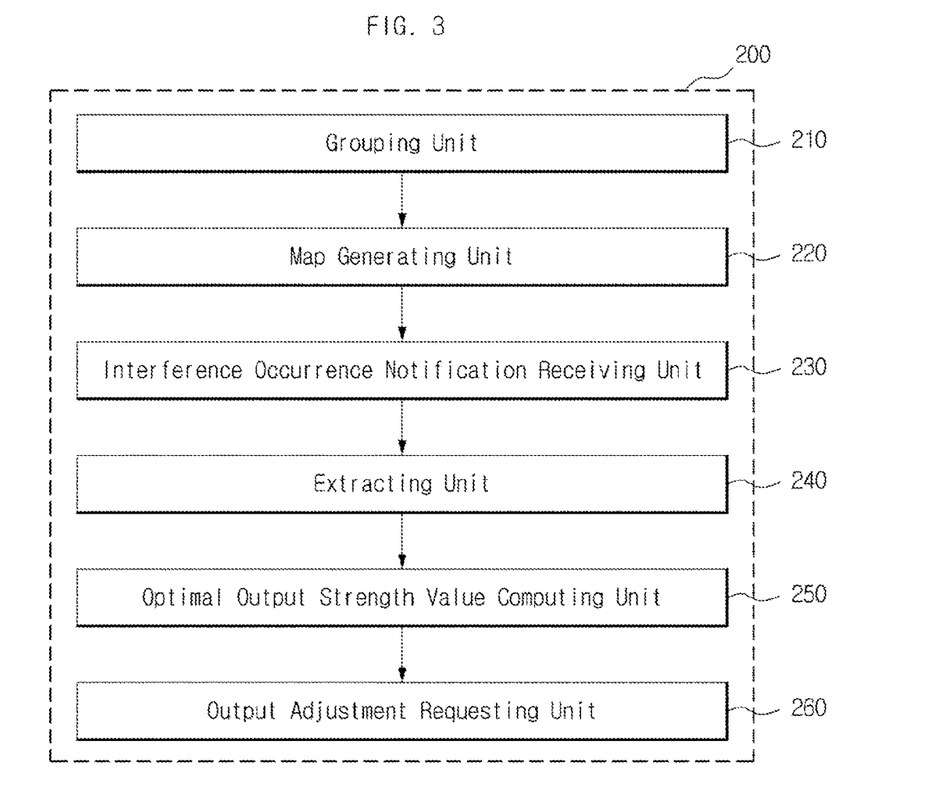
FIG. 3 illustrates the configuration of a device for controlling the wireless access point in accordance with an exemplary embodiment.

FIG. 3 illustrates the configuration of the AP control device 200 in accordance with an exemplary embodiment.

The AP control device 200 in accordance with an exemplary embodiment includes a grouping unit 210, a map generating unit 220 ("map generator"), an interference occurrence notification receiving unit 230 ("interference occurrence notification receiver", an extracting unit 240 ("extractor"), an optimal output strength value computing unit 250 ("optimal output strength value calculator") and an output adjustment requesting unit 260 ("output adjustment requester").

The grouping unit 210 groups APs that use the same channel based on the information on channels currently used by the APs, once the information on currently used channels, RSSI values and output strength values of neighboring APs and the AP 100 is received from the AP 100.

The map generating unit 220 computes the RSSI value between the grouped APs that use the same channel and the output strength value of the grouped APs.

Then, the map generating unit 220 generates a virtual map that includes the RSSI value between the grouped APs and the output strength value of the grouped APs.

The interference occurrence notification receiving unit 230 receives a message indicating whether interference has occurred between the grouped Aps, from the AP 100.

The occurrence of interference between the grouped APs can be determined by the AP 100 based on the RSSI value and the number of communication failures (data_fail_cnt_past, data_fail_cnt_current) between the grouped AP and the wireless terminal that is accessed to the grouped AP. As this was described earlier with reference to the AP 100, it will not be described herein below.

Once interference occurs between the grouped APs, the extracting unit 240 refers to the virtual map generated by the map generating unit 220 to extract the AP that has the highest RSSI value among the grouped APs.

For example, if the grouped APs include AP1, AP2 and AP3 and the RSSI value (RSSI_13) between AP1 and AP3 has the highest value in the virtual map, the AP that has the highest RSSI value is AP1.

In the virtual map, the RSSI value of the $n^{th}$ AP received from the $m^{th}$ AP can be expressed as RSSI_mn, and the $m^{th}$ AP can be regarded as having the highest RSSI value if RSSI_mn has the highest value in the virtual map.

The optimal output strength value computing unit 250 computes the corrected output strength value (Ptx_modi) for minimizing the interference between the APs, based on an RSSI value (RSSI_m) of an AP extracted by the extracting unit 240, a predetermined threshold value (RSSI_th) of RSSI between the grouped APs and a currently used output strength value (Ptx_c) of the grouped Aps.

The optimal output strength value computing unit 250 computes the corrected output strength value (Ptx_modi) by subtracting the difference between RSSI_m and RSSI_th from Ptx_c.

This can be mathematically expressed as follows.

$$Ptx\_modi = Ptx\_c - (RSSI\_m - RSSI\_th)$$

The output adjustment requesting unit 260 sends an output strength adjustment request to each of the grouped APs so as to adjust the current output strength value based on Ptx_modi.

The elements illustrated in FIG. 2 and FIG. 3 in accordance with an exemplary embodiment refer to hardware configurations, such as FPGA (Field Programmable Gate Array) or ASIC (Application Specific Integrated Circuit), and perform certain functions.

Nevertheless, it shall not mean that the elements are restricted to either software or hardware, and it is possible that each of the elements is configured to be in an addressable storage medium and to run one or more processors.

Therefore, the elements can include, for example, elements such as software elements, object-oriented software elements, class elements and task elements, as well as processes, functions, attributes, procedures, sub-routines, segments of program code, drivers, firmware, micro codes, circuits, data, database, data structures, tables, arrays and variables.

The elements and functions provided within the elements can be combined into a smaller number of elements or separated into additional elements.

Figure 4:
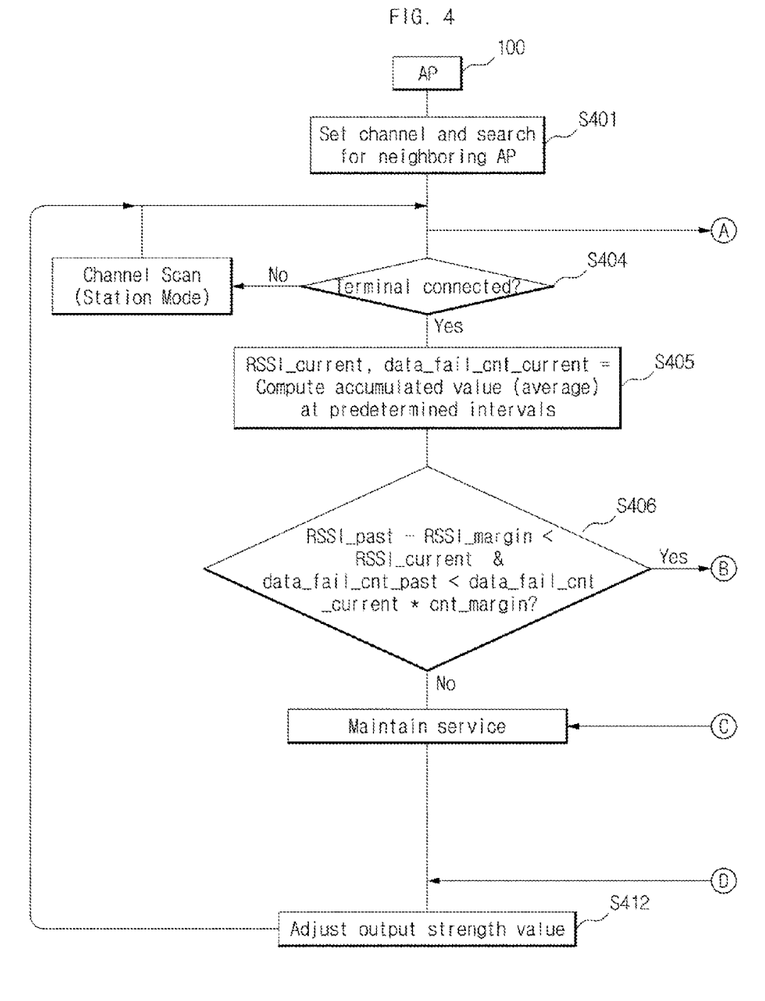
FIGS. 4 and 5 are flow diagrams illustrating how the wireless access point is controlled in accordance with an exemplary embodiment.
Figure 5:
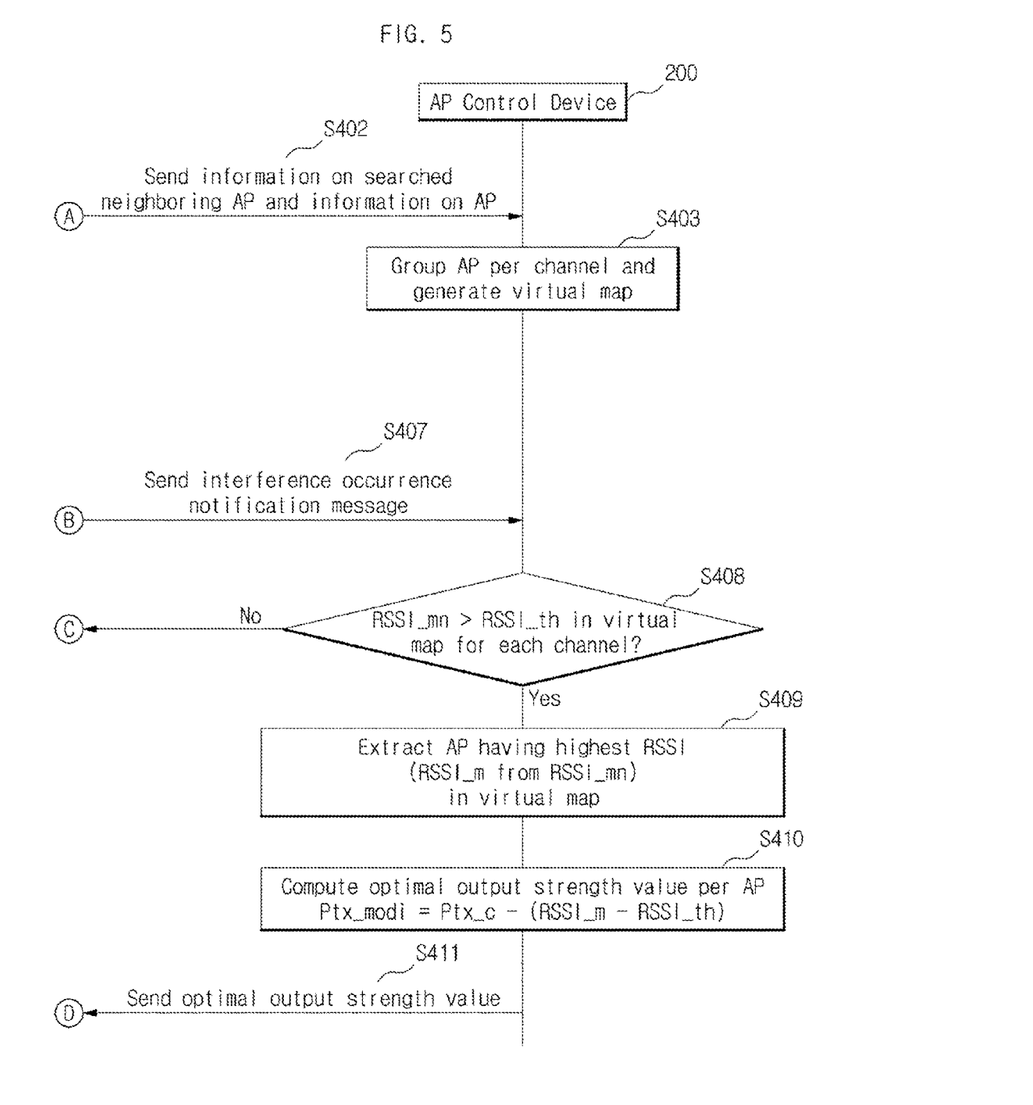

FIGS. 4 and 5 are flow diagrams illustrating how the wireless access point is controlled in accordance with an exemplary embodiment.

Hereinafter, the flow diagrams of FIGS. 4 and 5 will be described with reference to the elements of the system shown in FIG. 1.

First, the AP 100 sets the channel for communication and searches for neighboring APs that are present within a predetermined range (S401).

After the operation of S401, the AP 100 sends the information on the searched neighboring APs and the information on the AP 100 to the AP control device 200 (S402).

Here, the information on the neighboring APs and the information on the AP 100 can include at least one of the channels that is currently used, the RSSI value and the output strength value.

After the operation of S402, the AP control device 200 groups the APs that are using the same channel based on the information on the neighboring APs and the information on the AP 100 received from the AP 100, and generates a virtual map based on the RSSI value and the output strength value between the grouped APs (S403).

After the operation of S403, the AP 100 (more specifically, the grouped APs) checks for connection by the terminal at every predetermined interval (S404) and, if the terminal is connected, computes an average of accumulated values of RSSI_current and data_fail_cnt_current at the predetermined intervals (S405).

After the operation of S405, the AP 100 determines whether interference has occurred by checking "RSSI_past−RSSI_margin<RSSI_current and data_<fail_cnt_past<data_fail_cnt_current*cnt_margin" (S406).

If the operation of S406 determines that interference has occurred, the AP 100 sends an interference occurrence notification message to the AP control device 200 (S407).

If the operation of S406 determines that interference has not occurred, the AP 100 can maintain the current service.

Here, if, upon checking for the connection of the terminal at the predetermined intervals, the operation of S406 determines that no terminal is connected, the AP 100 can be switched to a station mode and repeat the operation of S402.

After the operation of S407, the AP control device 200 refers to the virtual map generated in the operation of S403 to check whether there is any RSSI_mn that is greater than RSSI_th (S408).

If, upon checking in the operation of S408, there is RSSI_mn that is greater than RSSI_th, the AP control device 200 extracts an AP that has the highest RSSI value in the virtual map generated in the operation of S403 (S409).

If, upon checking in the operation of S408, there is no RSSI_mn that is greater than RSSI_th, the AP control device 200 can maintain the current service.

After the operation of S409, the AP control device 200 computes the corrected output strength value, i.e., Ptx_modi, based on the RSSI value of AP extracted in the operation of S407, i.e., RSSI_m, the predetermined threshold value of RSSI between the grouped APs, i.e., RSSI_th, and the currently used output strength value of the grouped APs, i.e., Ptx_c (S410).

After the operation of S410, the AP control device 200 simultaneously transmits Ptx_modi to the grouped APs (S411), and the grouped APs adjust the current output strength value based on the received Ptx_modi (S412).

Figure 6:
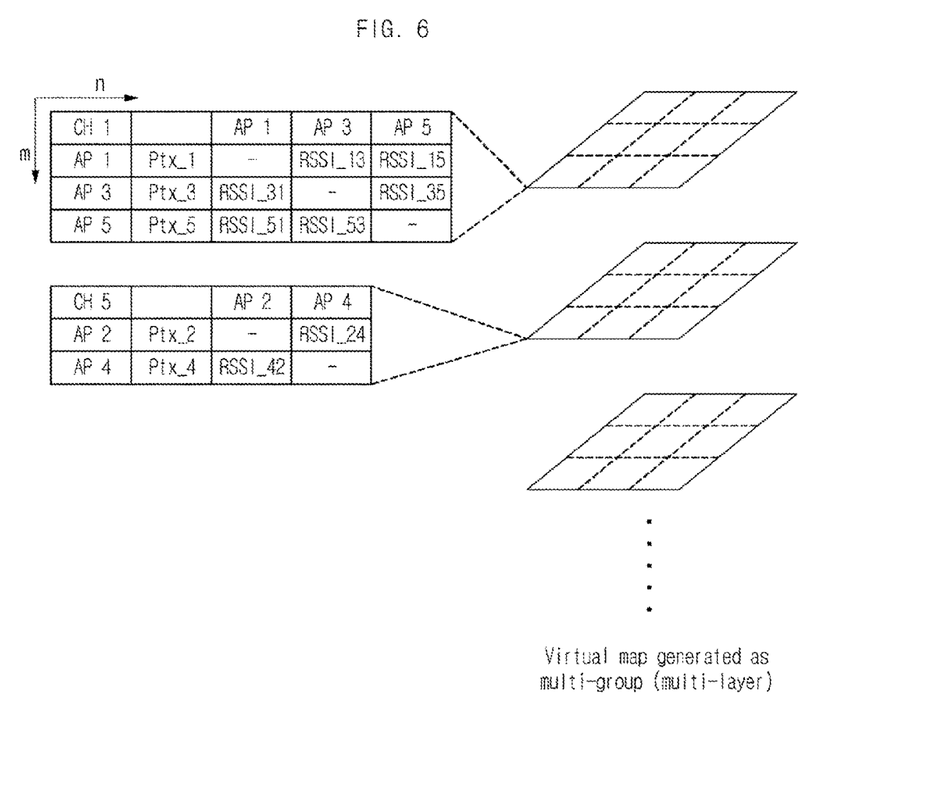
FIG. 6 is a virtual map generated by the device for controlling the wireless access point in accordance with an exemplary embodiment.

FIG. 6 is a virtual map generated by the device for controlling the wireless access point in accordance with an exemplary embodiment.

In FIG. 6, APs that use the same channel (CH 1, CH 5) are grouped together to generate the virtual map.

The APs using CH 1 are AP 1, AP 3 and AP 5, and it can be seen that the RSSI value between these APs and the output strength value of each of these APs are included.

Moreover, the APs using CH 5 are AP 2 and AP 4, and the RSSI value between these APs and the output strength value of each of these APs are included in the virtual map.

As described earlier, if the highest RSSI value is RSSI_13, i.e., the RSSI value between AP 1 and AP 3, AP 1 becomes the AP having the highest RSSI value, which is expressed as "RSSI_m" in the exemplary embodiment.

As illustrated in 6, the virtual map generated by the AP control device 200 can be generated and managed as a multi-group (or a multi-layer), depending on the channel used.

The above description of exemplary embodiments is for illustrative purpose only, and it shall be appreciated that the present inventive concept can be readily modified to a different specific form without changing the technical ideas or essential features of the present inventive concept by a person having ordinary skill in the art to which the present invention pertains.

Therefore, it shall be appreciated that the exemplary embodiment described above is illustrative but not restrictive in every aspect.

For instance, it is possible that any element described in the singular form is embodied by being separated and, likewise, any separated elements can be embodied by being combined.

The scope of the present invention is defined by the claims appended below rather than by the above description, and it shall be understood that the meanings and scope of the claims as well as any and every modification and permutation derived from the equivalents are included in the scope of the present invention.

What is claimed is:

1. A device for controlling a wireless access point comprising:
   a grouping unit configured to group wireless access points using a same channel based on channel use information received from the wireless access points;
   a map generator configured to compute a received signal strength indicator (RSSI) between the grouped wireless access points and an output strength value for each of the grouped wireless access points;
   an extractor configured to extract a wireless access point having a highest RSSI value among the grouped wireless access points, if interference occurs between the grouped wireless access points; and
   an optimal output strength value calculator configured to compute a corrected output strength value based on the highest RSSI value of the extracted wireless access point, a predetermined threshold value of the RSSI between the grouped wireless access points, and a currently used output strength value.

2. The device of claim 1, further comprising an output adjustment requester configured to transmit an output strength adjustment request to each of the grouped wireless access points, the output strength adjustment request being related to adjusting a current output strength value based on the corrected output strength value.

3. The device of claim 1, further comprising an interference occurrence notification receiver configured to receive a message indicating whether interference has occurred between the grouped wireless access points,
   wherein occurrence of the interference is determined by the grouped wireless access points based on an RSSI value and a number of ACK communication failures between the grouped wireless access points and a wireless terminal that accesses the grouped wireless access points.

4. The device of claim 1, wherein the map generator is configured to generate a virtual map including RSSI values between the grouped wireless access points and the output strength value of each of the grouped wireless access points.

5. The device of claim 1, wherein the optimal output strength value calculator is configured to compute the corrected output strength value by subtracting a difference between the RSSI value of the extracted wireless access point and a predetermined threshold value of an RSSI value between the grouped wireless access points, from the currently used output strength value.

6. A wireless access point having an output strength value thereof controlled by a device for controlling the wireless access point, the wireless access point comprising:
   a channel setter configured to set a channel for communication;
   an information transmitter configured to search for neighboring wireless access points through the set channel and transmit information on the searched neighboring wireless access points and the wireless access point;
   a calculator configured to compute a number of ACK communication failures with a wireless terminal and a received signal strength indicator (RSSI) value, once the wireless terminal is connected; and
   an interference occurrence notifier configured to transmit a message indicating that interference has occurred, to the device for controlling the wireless access point if it is determined that the interference with the neighboring wireless access points has occurred, based on the computed number of ACK communication failures with the wireless terminal and the RSSI value.

7. The wireless access point of claim 6, further comprising an output strength adjuster configured to receive a corrected output strength value from the device for controlling the wireless access point and adjust a current output strength value based on the corrected output strength value.

8. The wireless access point of claim 6, wherein the calculator is configured to check whether the wireless terminal is connected and, if there is no wireless terminal connected, the calculator requests the information transmitter to search for the neighboring wireless access points.

9. The wireless access point of claim 6, wherein the interference occurrence notifier is configured to determine that the occurrence has occurred if a current RSSI value is greater than a previous RSSI value and the number of ACK communication failures with a current wireless terminal is greater than the number of ACK communication failure with a previous wireless terminal.

10. The wireless access point of claim 9, wherein the interference occurrence notifier is configured to apply a predetermined margin value to the previous RSSI value and the number of ACK communication failures with the current wireless terminal, and fluctuation of the RSSI value caused by a movement of the wireless terminal is considered for the predetermined margin value.

11. A method for controlling an output strength value of a wireless access point by a device for controlling the wireless access point, the method comprising:

(a) setting a channel for communication, searching for neighboring wireless access points, and transmitting information on the wireless access point and the searched neighboring wireless access points to the device for controlling the wireless access point, wherein the setting, searching and transmitting is performed by the wireless access point;
(b) grouping wireless access points using a same channel, based on the information on the wireless access point and the neighboring wireless access points received from the wireless access point, the grouping being performed by the device for controlling the wireless access point;
(c) determining whether interference has occurred between the grouped wireless access points and transmitting the determination to the device for controlling a wireless access point, the determining and the transmitting the determination being performed by the grouped wireless access points;
(d) computing a corrected output strength value for reducing the interference and transmitting the corrected output strength value to the grouped wireless access points, the computing and the transmitting the corrected output strength being performed by the device for controlling the wireless access point; and
(e) adjusting a current output strength value based on the corrected output strength value, the adjusting being performed by the grouped wireless access points.

* * * * *

UNITED STATES PATENT AND TRADEMARK OFFICE
CERTIFICATE OF CORRECTION

PATENT NO. : 9,271,243 B2  
APPLICATION NO. : 14/123672  
DATED : February 23, 2016  
INVENTOR(S) : Yoon et al.

Page 1 of 1

It is certified that error appears in the above-identified patent and that said Letters Patent is hereby corrected as shown below:

In the Claims

In Claim 11, at Column 11, Line 22, delete "grouped".
In Claim 11, at Column 11, Line 22, delete "points" and insert therefore --point--.
In Claim 11, at Column 11, Line 28, delete "grouped".
In Claim 11, at Column 11, Line 28, delete "points" and insert therefore --point--.

Signed and Sealed this
Twentieth Day of June, 2023

Katherine Kelly Vidal
*Director of the United States Patent and Trademark Office*